April 16, 1935.  J. G. PORTTEUS  1,997,832
COOKING UTENSIL
Filed Aug. 10, 1933
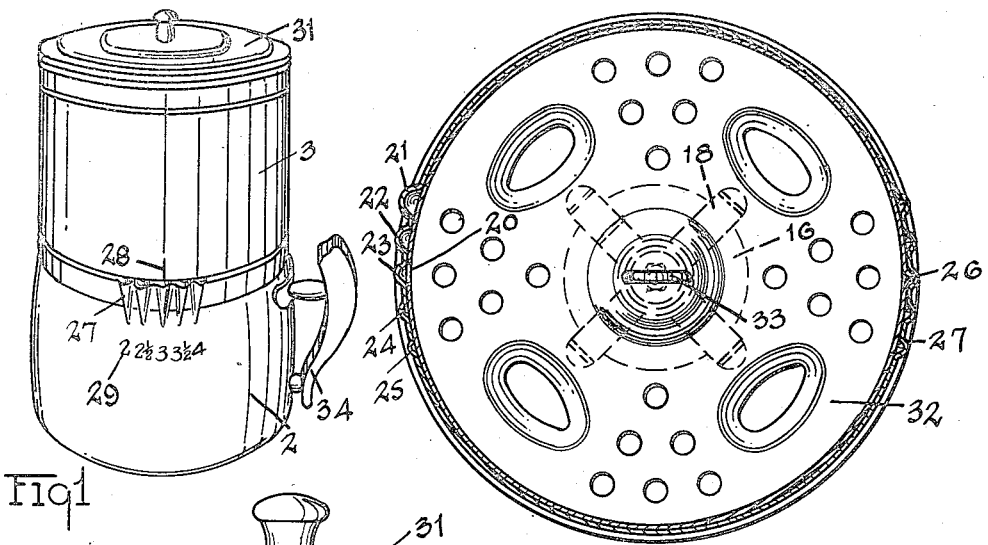
Fig 1
Fig 3
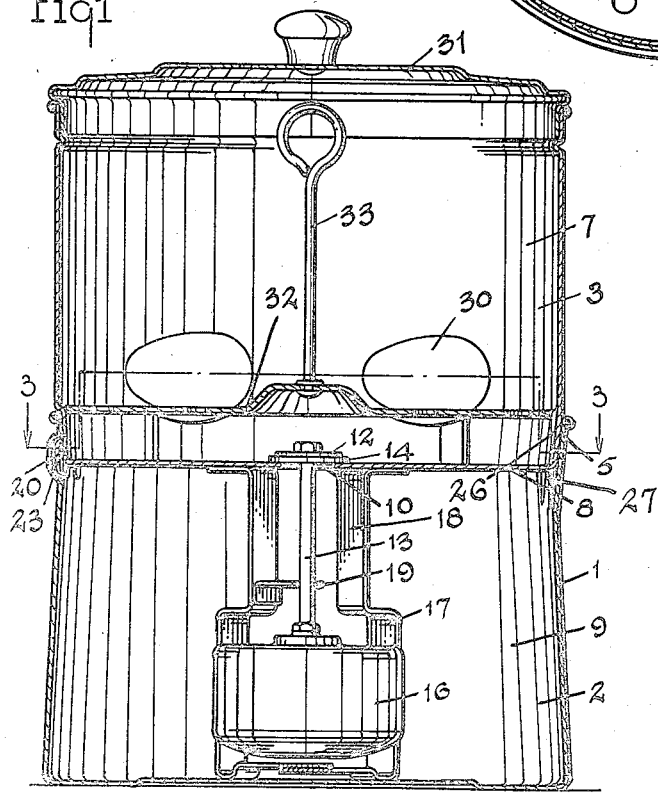
Fig 2
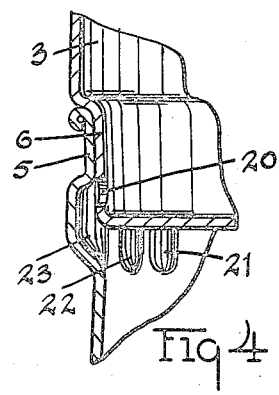
Fig 4
Inventor
James G. Portteus
By Faust F. Crampton
Attorney Patented Apr. 16, 1935

1,997,832

UNITED STATES PATENT OFFICE 1,997,832

COOKING UTENSIL

James G. Portteus, Toledo, Ohio, assignor of one-half to John M. Boyle, Toledo, Ohio Application August 10, 1933, Serial No. 684,596

10 Claims. (Cl. 161—16)

My invention relates to cooking utensils and more particularly to a container for cooking foods and like in preparation for subsequent use and consumption.

My invention provides a container for cooking food in a manner commonly known as fireless cooking, wherein the food is subjected to the indirect or radiant heat given off by preheated medium without application of further heat to the food or to the medium. The invention particularly provides a fireless cooking container in which the preheated medium used comprises a liquid body or volume which is readily flowable at ordinary cooking temperatures.

My invention has for an object to provide a container having means for maintaining a liquid heat transmitting medium in close and heat transmissible proximity to the food to be cooked or prepared for a definite and predetermined period of time. Another object of the invention is to provide means for carrying off the liquid heat transmitting medium from a position of proximity to the food after an elapse of a definite predetermined period of time to terminate the further process of cooking.

A still further object of the invention is to provide a container having means for directing the vapor heat or heat of the liquid heat transmitting medium toward the food to maintain the food in a warm and palatable condition over a period of time after the termination of the cooking process. The invention provides, therefore, a container readily applicable to the cooking of eggs in the shell or corn on the cob and other foods, the cooking preparation of which consists largely in the subjection of the foods to hot water or other liquids for a definite period of time and subsequent removal therefrom.

A particular object of the invention is to provide a container adapted to receive the food to be prepared and cooked together with a preheated liquid heat transmitting medium, such as preheated water, the container having means for carrying off the liquid medium automatically after the elapse of a definite time interval, the said means being actuated by the liquid medium. A further object of the invention is to provide a reservoir for receiving the liquid medium after the elapse of a definite period of time and for maintaining it relative to the prepared food so that the vapor or radiant heat given off by the medium may be availed of to maintain the food in a warm and palatable condition over an indefinite period of time.

The invention consists in other features and advantages which will appear from the following description and upon examination of the drawing. Structures containing the invention may partake of different forms and may be varied in their details and still embody the invention. To illustrate a practical application of the invention, we have selected a cooking utensil embodying the invention as an example of the various structures and details thereof that contain the invention and shall describe the selected structure hereinafter, it being understood that variations may be made without departing from the spirit of the invention. The particular structure selected is shown in the accompanying drawing.

Fig. 1 of the drawing illustrates a perspective view of the cooking utensil. Fig. 2 illustrates a view of an enlarged longitudinal section of the utensil shown in Fig. 1. Fig. 3 illustrates a view of a section taken along the plane of the line 3—3 indicated in Fig. 2. Fig. 4 illustrates a further enlarged view of the control means illustrated in Fig. 2.

Referring particularly to the cooking and preparation of eggs in the shell, although it will be appreciated by those skilled in the art that the remarks made hereinafter are substantially applicable to the cooking of other foods with the same force and effect, it has been found that more desirable results in tastiness and health-giving or nourishing qualities, can be obtained from eggs if the eggs are cooked or "coddled" by subjecting them to a pre-boiled or heated body of water for a definite period of time than can be obtained by active boiling. Consequently, it has been the practice to bring a volume of water to boil and to pour the same over the egg which has been placed in a container for that purpose. Variations in amount of cooking, as from soft boiled to hard boiled, to meet various individual tastes is obtained by timing the period in which the egg remains in the preheated water and pouring off the same or withdrawing the egg from the water after an elapse of time. This practice requires the attention of an individual together with a suitable time indicating device to insure that the egg is withdrawn from the water at the expiration of the time period. The attending individual might be employing the said time period in the performance of other tasks of cookery were it not for the fact that overcooking even for a minor period of time beyond that required results in an almost totally different taste and often substantial spoilation. My invention provides a container in which may be placed the egg to be cooked and preheated water, and after the elapse of a definite period of time, the water will be automatically carried off, permitting the attending individual freedom to perform other tasks, as well as insuring the cooked quality of the egg.

The container has two compartments or chambers located in vertical alignment with each other and separated by a suitable dividing wall. Preferably, to enable ready dismantling for cleaning purposes, the container is formed of two sections, an upper and lower section forming the chambers, the bottom wall of the upper section comprising the dividing wall of the container. The dividing wall has an opening of a substantial diameter to permit speedy evacuation of a liquid body from the upper chamber to the lower chamber. The opening is controlled by a suitable valve member which is operated by an element located in the lower chamber. The said element is sensitive to and actuated by the presence of a liquid in the bottom chamber and operates to open and close the opening. A port for the transmission of the liquid from the upper chamber to the lower chamber is provided and communicates with the lower chamber through one of a plurality of channels or passageways of varying cross sectional area. The relation and registration of the port with any one of the plurality of channels may be varied as desired to vary the rate of introduction of liquid to the lower chamber and consequently vary the period within which the said element is actuated to operate the valve member. Thus it may be seen that the port can be registered with one of the channels, all of which may be suitably marked to identify their respective speed of liquid transmission, and an egg together with preheated water may be placed in the upper chamber. After the expiration of the determined period of time during which sufficient water has flowed into the lower chamber, the valve operating element, will be actuated, permitting the balance of the water to flow into the lower chamber, where it will be retained and will give off sufficient vapor or radiant heat to maintain the egg in a warm, palatable condition.

In the particular utensil shown in the accompanying drawing, the container 1 is formed of a pair of units or sections 2 and 3. The section 2 is located in vertical alignment with and below the section 3. Preferably the section 2 has a lip portion 5 which is adapted to nestingly or telescopically receive an offset portion 6 formed proximate to the bottom of the wall of the section 3. The section 3, therefore, provides a cover to the section 2, the joint therebetween being maintained relatively tight, tending to prevent escape of heat or liquid therefrom.

The section 3 has an internal chamber 7 which is described by the side walls of the section and a bottom 8. The section 2 likewise has an internal chamber 9 which communicates with the chamber 7 through an opening 10 formed in the bottom 8. The opening 10 is of a diameter to permit ready and speedy flow of a liquid body from the chamber 7 to the chamber 9. The opening 10 is controlled by means of a suitable valve member having a suitable head 12 and a stem 13. The valve head 12 may be provided with a suitable gasket 14 and is mounted on the stem 13 so as to seat against the edges of the opening 10. The valve stem 13 preferably extends into the chamber 9 and is connected to an element sensitive to and actuated by the presence of a liquid in the chamber 9. Preferably, as shown, the element comprises a float 16, which is freely movable within the confines of a supporting spider or basket 17. The basket 17 may be connected by bracket portions 18 to the bottom 8. If desired, the bracket portions 18 may have a horizontal extension 19 through which the valve stem 13 extends and provides in that connection a suitable stem guide. Thus it will be seen that upon an introduction of a liquid into the chamber 9 of a sufficient depth to lift the float 16, the opening will be opened.

In order to introduce a liquid into the chamber 9, the section 3 is provided with a port 20 which communicates through one of a plurality of passageways, 21, 22, 23, 24, and 25 with the chamber 9. The port 20 is preferably formed in the offset wall portion 6 of the section 3 and the passageways are preferably formed in the lip portion 5 of the section 2. The passageways may be readily formed by pressing out the wall of the lip portion 5 in a radial direction and to dimensions of varying distance from the axis of the section 2, so that the passageway 22 is of a less cross sectional dimension than the passageway 21, and passageway 23 is less than passageway 22, and passageway 24 is less than passageway 23, and so forth. Thus when the section 3 is located in telescopic engagement with the section 2, the passageways will be formed by the press out portions and the offset portion 6 of the section 3. If desired, the location of the port 20 on the section 3 may be indicated by a suitable legendary mark 28, and the position of the passageways on the section 2 may be indicated by the marks 29. Preferably, the indicating marks 29 are of a character so as to inform the user of the period of time that will be required to pass sufficient liquid through each particular passageway from the chamber 7 to the chamber 9 in order to lift the float 16 and thus indicate the period of time that the liquid heat transmitting medium will be maintained in the chamber 7 and proximate to the food. If desired, the section 3 may be provided with a boss 26 which is adapted to be received in one of the plurality of grooves 27 formed in the section 2, and thus lock the sections as against angular movement relative to each other and to insure positive registration of the port 20 with the selected passageway.

Thus, food, such as the egg 30, may be located in the chamber 7, and the port 20 be located in registration with one of the passageways, depending on whether the user desires to cook the egg for a long or short period. Preheated water is then poured into the chamber 7 so as to normally cover the egg 30. Preferably the chamber is closed by a suitable cover 31 to retain the heat and vapor within the chamber. After the elapse of the predetermined period of time, the float 16 will automatically open the valve to permit the water to flow into the chamber 9, where it will be maintained.

If desired, the egg 30 may be supported in the chamber 7 on a suitable reticulated tray 32 having handle 33. The tray 32 permits of easy handling of the egg 30 within the chamber 7. A handle 34 may be provided for accommodating the handling of the whole utensil.

I claim:

1. A cooking container for food, the container having a pair of chambers, one of the said pair of chambers adapted to receive the food and a volume of preheated liquid, means for withdrawing a portion of said volume of liquid from the first named chamber during the elapse of a predetermined period of time, an opening formed in the wall of the first named chamber communicating with the other of the said pair of chambers, a movable element for closing the said opening, and means actuated upon the withdrawal of said portion of liquid to move the element to open the said opening.

2. A cooking container for food, a wall for dividing the container into a pair of chambers, one of the said pair of chambers adapted to receive the food and a volume of preheated liquid, means for withdrawing a part of said volume of liquid from said chamber during the elapse of a predetermined period of time, an opening formed in said wall, and means for controlling said opening actuated upon the said withdrawal of the said part of said volume.

3. A cooking container for food, the container having a pair of chambers, one of the said pair of chambers adapted to receive the food and a volume of preheated liquid, means for transmitting a portion of said volume of liquid from the first named chamber to the other of the said pair of chambers during the elapse of a predetermined period of time, an opening formed in a wall of the first named chamber communicating with the second named chamber, a movable element for closing said opening, a means connected to said element and actuated by said portion of liquid to move the said element to an open position.

4. A cooking container for food, the container having a pair of chambers, one of the said pair of chambers adapted to receive the food and a volume of preheated liquid, means for transmitting a portion of said volume of liquid from the first named chamber to the other of the said pair of chambers during the elapse of a predetermined period of time, an opening formed in a wall of the first named chamber communicating with the second named chamber, a valve member for closing said opening, and means located in the second named chamber and actuated by said portion of liquid to move the valve member to an open position relative to said opening.

5. A cooking container for food, the container having a pair of chambers, one of the said pair of chambers adapted to receive the food and a volume of preheated liquid, means for transmitting a portion of said volume of liquid from the first named chamber to the other of the said pair of chambers during the elapse of a predetermined period of time, an opening formed in a wall of the first named chamber communicating with the second named chamber, a valve member for closing said opening, and a float connected to said valve member and actuated by said portion of liquid to move said valve member to an open position relative to said opening.

6. A cooking container for food, the container having a pair of chambers, one of said pair of chambers adapted to receive the food and a volume of preheated liquid, means for transmitting a portion of said volume of liquid from said chamber to the other of said pair of chambers during the elapse of a predetermined period of time, means for adjustably varying the rate of transmission of said portion of liquid, an opening formed in the wall of the first named chamber, a valve member for closing said opening, and an element connected to said valve member actuated by said portion of liquid to move the valve member to an open position relative to said opening and permit the discharge of said volume of liquid from the first named chamber into the second named chamber.

7. A cooking container for food, the container adapted to receive food and a quantity of liquid, means for withdrawing a portion of said quantity of liquid during the elapse of a predetermined period of time, an opening formed in the container, and means for normally maintaining the opening closed and actuated to open the opening upon the said withdrawal of the said portion of the said quantity of liquid.

8. A cooking container for food, a wall for dividing the container into a pair of chambers disposed at different relative heights, the upper of said pair of chambers adapted to receive food and a quantity of liquid, means for withdrawing a portion of said quantity of liquid during the elapse of a predetermined period of time, an opening formed in said wall, and means for normally maintaining the opening closed and actuated upon said withdrawal of said portion of liquid to open the opening to permit the flow of the liquid from the upper chamber to the lower of the said pair of chambers.

9. A cooking container for food, the container having a pair of chambers, one chamber of the said pair of chambers adapted to receive a quantity of liquid for applications thereof to the food, means for conveying a portion of said quantity of liquid from said chamber to the second chamber of said pair of chambers during the elapse of a predeterminedly extended period of time, and means actuated by said conveyed portion of the liquid operative to convey remaining portions of said quantity of liquid to the second named chamber in a period of time comparatively shorter than the first named period of time.

10. A cooking container for food, the container having a pair of chambers, one chamber of said pair of chambers adapted to receive a quantity of liquid for application thereof to the food, means for conveying a portion of said quantity of liquid from said chamber to the second chamber of said pair of chambers at a predetermined volume per unit of time, and means actuated by said conveyed portion of the liquid operative to convey remaining portions of said quantity of liquid to the second named chamber at an increased volume per unit of time.

JAMES G. PORTTEUS.